United States Patent [19]
Itoh et al.

[11] Patent Number: 5,558,942
[45] Date of Patent: Sep. 24, 1996

[54] ULTRAVIOLET RAY ABSORBENT COLORED GLASS

[75] Inventors: Mizuki Itoh; Takashi Kijima, both of Yokohama, Japan

[73] Assignee: Asahi Glass Company Ltd., Tokyo, Japan

[21] Appl. No.: 338,800

[22] Filed: Nov. 10, 1994

[30] Foreign Application Priority Data

Nov. 12, 1993 [JP] Japan ................................ 5-283301

[51] Int. Cl.$^6$ ................................................ B32B 17/06
[52] U.S. Cl. ...................... 428/426; 428/411.1; 428/446; 428/688; 501/55; 501/68; 501/69; 501/70; 501/71; 501/72
[58] Field of Search ........................... 428/192, 195, 212, 428/411.1, 426, 688, 446; 501/55, 68, 69, 70, 71, 72

[56] References Cited

U.S. PATENT DOCUMENTS

| | | |
|---|---|---|
| Re. 34,639 | 6/1994 | Boulos et al. . |
| Re. 34,760 | 10/1994 | Boulos et al. . |
| 2,676,109 | 4/1954 | Barnes et al. . |
| 3,300,323 | 1/1967 | Plumat et al. . |
| 3,858,964 | 1/1975 | Piesslinger et al. . |
| 4,095,986 | 7/1978 | Matsuda et al. . |
| 4,104,076 | 8/1978 | Pons . |
| 4,192,689 | 3/1980 | Rinehart . |
| 4,203,746 | 5/1980 | Battigelli et al. . |
| 4,270,945 | 6/1981 | Amrheim et al. . |
| 4,312,953 | 1/1982 | Mills et al. . |
| 4,339,541 | 7/1982 | Dela Ruye . |
| 4,366,252 | 12/1982 | Weaver . |
| 4,376,829 | 3/1983 | Daiku . |
| 4,396,722 | 8/1983 | Rapp . |
| 4,525,462 | 6/1985 | Behr . |
| 4,701,425 | 10/1987 | Baker et al. . |
| 4,713,359 | 12/1987 | Lubelski et al. . |
| 4,738,938 | 4/1988 | Kunkle et al. . |
| 4,792,536 | 12/1988 | Pecoraro et al. . |
| 4,866,010 | 9/1989 | Boulos et al. . |
| 4,873,206 | 10/1989 | Jones . |
| 4,944,984 | 7/1990 | Kunert . |
| 4,998,784 | 3/1991 | Freeman et al. . |
| 5,013,487 | 5/1991 | Cheng . |
| 5,023,210 | 6/1991 | Krumwiede et al. . |
| 5,069,826 | 12/1991 | Cheng . |
| 5,070,048 | 12/1991 | Boulos et al. . |
| 5,071,796 | 12/1991 | Jones . |
| 5,077,133 | 12/1991 | Cheng . |
| 5,077,240 | 12/1991 | Hayden et al. . |
| 5,089,444 | 2/1992 | Hattori et al. . |
| 5,112,778 | 5/1992 | Cheng et al. . |
| 5,120,584 | 6/1992 | Ohlenforst et al. . |
| 5,121,748 | 6/1992 | Ditz et al. . |
| 5,213,828 | 5/1993 | Winter et al. . |
| 5,214,008 | 5/1993 | Beckwith et al. . |
| 5,215,944 | 6/1993 | Jones . |
| 5,240,886 | 8/1993 | Gulotta et al. . |
| 5,250,098 | 10/1993 | Platts . |
| 5,256,607 | 10/1993 | Kerko et al. . |
| 5,261,718 | 11/1993 | Ohlenforst et al. . |
| 5,264,400 | 11/1993 | Nakaguchi et al. . |
| 5,268,335 | 12/1993 | Kerko et al. . |
| 5,278,108 | 1/1994 | Cheng et al. . |

(List continued on next page.)

FOREIGN PATENT DOCUMENTS

| | | |
|---|---|---|
| 2109059 | 5/1994 | Canada . |
| 0507985 | 10/1992 | European Pat. Off. . |
| 0527487 | 2/1993 | European Pat. Off. . |
| 2390390 | 1/1979 | France . |
| 2463108 | 3/1981 | France . |
| 2672587 | 8/1992 | France . |
| 2690437 | 10/1993 | France . |
| 2509187 | 3/1974 | Germany . |
| 3220072-A | 12/1983 | Germany . |
| 220592A | 4/1985 | Germany . |
| 3009805 | 1/1978 | Japan . |
| 53-045315 | 4/1978 | Japan . |
| 60-215546-A | 10/1985 | Japan . |
| 61-136936-A | 6/1986 | Japan . |
| 443004 | 3/1975 | U.S.S.R. . |
| 459437 | 4/1975 | U.S.S.R. . |
| 449890 | 7/1975 | U.S.S.R. . |
| 471315 | 10/1975 | U.S.S.R. . |
| 631473 | 11/1975 | U.S.S.R. . |

(List continued on next page.)

OTHER PUBLICATIONS

European Search Report Dated Jan. 12, 1996.
Database WPI Section CH, Week 9250 Abstract (JP 4310539 Nov. 2, 1992).
Glass Digest, "Auto Glass News", Feb. 15, 1993–p. 24.
Glass Digest, "News About Auto Glass", Jul. 15, 1993—pp. 24–25.
Glass Digest, "Three Factors Which Most Affect the Future of Vehicle Glass", Aug. 15, 1993—pp. 108–112.
Glass Digest, "News About Auto Glass", Sep. 15, 1993—p. 26.
Glass Digest, "News About Auto Glass", Dec. 15, 1993—p. 22.
Glass Digest, "News About Auto Glass", Oct. 15, 1993—pp. 23–24.
American Glass Review, Jan. 1990—pp. 4–5.
Libby–Owens–Ford News, "LOF Introduces a Bold New Step in Solar Privacy Glass", pp. 1–3.

*Primary Examiner*—William A. Krynski
*Attorney, Agent, or Firm*—Oblon, Spivak, McClelland, Maier & Neustadt, P.C.

[57] ABSTRACT

Ultraviolet ray absorbent colored glass for buildings and vehicles, which consists essentially of from 65 to 75 wt % of $SiO_2$, from 0.1 to 5.0 wt % of $Al_2O_3$, from 10 to 18 wt % of $Na_2O$, from 0 to 5 wt % of $K_2O$, from 5 to 15 wt % of CaO, from 1 to 6 wt % of MgO, from 0.05 to 1.0 wt % of $SO_3$, from 0.08 to 0.20 wt % of vanadium as calculated as $V_2O_5$, from 0.36 to 0.65 wt % of $MnO_2$, from 0 to 0.0020 wt % of CoO and from 0.06 to 0.18 wt % of iron as calculated as $Fe_2O_3$, wherein from 0 to 10 wt % of the total iron content is FeO.

4 Claims, No Drawings

U.S. PATENT DOCUMENTS

| | | |
|---|---|---|
| 5,278,805 | 1/1994 | Kimball . |
| 5,296,294 | 3/1994 | Suki et al. . |
| 5,308,805 | 5/1994 | Baker et al. . |
| 5,316,854 | 5/1994 | Lin et al. . |
| 5,318,931 | 6/1994 | Nakaguchi et al. . |
| 5,320,986 | 6/1994 | Taniguchi et al. . |
| 5,328,768 | 7/1994 | Goodwin . |
| 5,344,798 | 9/1994 | Morimoto et al. . |
| 5,346,864 | 9/1994 | Maugendre et al. . |
| 5,346,867 | 9/1994 | Jones et al. . |
| 5,352,640 | 10/1994 | Combes et al. . |
| 5,362,689 | 11/1994 | Morimoto et al. . |
| 5,364,820 | 11/1994 | Morimoto et al. . |
| 5,366,940 | 11/1994 | Bolton et al. . |
| 5,372,977 | 12/1994 | Mazon-Ramos et al. . |
| 5,380,685 | 1/1995 | Morimoto et al. . |
| 5,385,872 | 1/1995 | Gulotta et al. . |
| 5,393,593 | 2/1995 | Gulotta et al. . |
| 5,403,664 | 4/1995 | Kurahashi et al. . |
| 5,403,789 | 4/1995 | Kerko et al. . |
| 5,405,811 | 4/1995 | Kerko et al. . |
| 5,411,922 | 5/1995 | Jones . |
| 5,438,024 | 8/1995 | Bolton et al. . |
| 5,446,007 | 8/1995 | Krashkevich et al. . |

FOREIGN PATENT DOCUMENTS

| | | |
|---|---|---|
| 504715 | 6/1976 | U.S.S.R. . |
| 511301 | 9/1976 | U.S.S.R. . |
| 528271 | 10/1976 | U.S.S.R. . |
| 536132 | 2/1977 | U.S.S.R. . |
| 547399 | 7/1977 | U.S.S.R. . |
| 557060 | 7/1977 | U.S.S.R. . |
| 579239 | 11/1977 | U.S.S.R. . |
| 579240 | 11/1977 | U.S.S.R. . |
| 594065 | 2/1978 | U.S.S.R. . |
| 612905 | 6/1978 | U.S.S.R. . |
| 614037 | 6/1978 | U.S.S.R. . |
| 632661 | 11/1978 | U.S.S.R. . |
| 709575 | 1/1980 | U.S.S.R. . |
| 753802 | 8/1980 | U.S.S.R. . |
| 895943 | 1/1981 | U.S.S.R. . |
| 821426 | 4/1981 | U.S.S.R. . |
| 952788-A | 8/1982 | U.S.S.R. . |
| 1106794-A | 8/1984 | U.S.S.R. . |
| 708031 | 4/1954 | United Kingdom . |
| WO91/07356 | 5/1991 | WIPO . |

ULTRAVIOLET RAY ABSORBENT COLORED GLASS

The present invention relates to a glass composition which has a high ultraviolet ray absorbing ability and a relatively high luminous transmittance and which has the same brown color as current colored plate and float glass for buildings and vehicles.

Heretofore, dark blue or green-colored infrared ray or ultrared ray absorbent glass containing a large amount of e.g. FeO, $Fe_2O_3$ and $CeO_2$, has been known (Japanese Unexamined Patent Publication No. 310539/1992 or No. 56466/1994). Further, glass having fine semiconductor crystals precipitated therein, so that it is capable of efficiently absorbing ultraviolet rays, is also known. However, the former glass contains a large amount of an iron component, whereby the luminous transmittance is low, and it is difficult to prepare brown-colored glass which is presently used for vehicles. Whereas, the glass with the fine semiconductor crystals can be formed stably only with borosilicate glass, and this method can not be applied to a float process as the typical process for the production of plate glass. Further, brown-colored glass has had a problem that it is likely to be discolored by ultraviolet rays.

It is an object of the present invention to obtain glass which is capable of absorbing ultraviolet rays and at the same time has a sufficient transmittance of visible lights and which will not be discolored by ultraviolet rays and has a color tone equivalent to conventional glass for buildings or vehicles.

The present invention has been made to solve the above-mentioned problems and provides ultraviolet ray absorbent colored glass for buildings and vehicles, which consists essentially of from 65 to 75 wt % of $SiO_2$, from 0.1 to 5.0 wt % of $Al_2O_3$, from 10 to 18 wt % of $Na_2O$, from 0 to 5 wt % of $K_2O$, from 5 to 15 wt % of CaO, from 1 to 6 wt % of MgO, from 0.05 to 1.0 wt % of $SO_3$, from 0.08 to 0.20 wt % of vanadium as calculated as $V_2O_5$, from 0.36 to 0.65 wt % of $MnO_2$, from 0 to 0.0020 wt % of CoO and from 0.06 to 0.18 wt % of iron as calculated as $Fe_2O_3$, wherein from 0 to 10 wt % of the total iron content is FeO.

Now, the present invention will be described in detail with reference to the preferred embodiments.

Firstly, the reasons for defining the above components will be explained.

If $SiO_2$ is less than 65 wt %, the weather resistance tends to be poor, and if it exceeds 75 wt %, the glass tends to undergo devitrification. If the proportion of $Al_2O_3$ is less than 0.1 wt %, the water resistance tends to be low, and if it exceeds 5%, the melting efficiency tends to be low. $Na_2O$ and $K_2O$ are components which accelerate melting rate of the raw materials. If $Na_2O$ is less than 10 wt %, no adequate effects above-mentioned can be obtained. On the other hand, if it exceeds 18 wt %, the weather resistance tends to be poor.

CaO and MgO are components which accelerate melting rate of the raw materials and which improve the weather resistance. If CaO is less than 5 wt %, no adequate effects above-mentioned can be obtained, and if they exceed 15 wt %, the glass tends to undergo devitrification. If MgO is added in a small amount, the above effects will increase. However, if it exceeds 6 wt %, the glass tends to undergo devitrification.

Vanadium is present in the most stable condition usually in the form of $V^{5+}$ in the glass and has an absorption band in a near ultraviolet region (350 nm), and thus it is a component which provides ultraviolet ray-absorbing effects. However, if the amount is less than 0.08 wt %, the effects tend to be low, and if it exceeds 0.20 wt %, its influence over absorption of near ultraviolet rays and visible lights tends to be substantial. The total iron amount in the glass composition of the present invention is within a range of from 0.06 to 0.18 wt % as $Fe_2O_3$. If the total iron amount is less than 0.06 wt %, the effects for absorbing ultraviolet rays tend to be inadequate, or the glass tends to undergo a color change to an amber color. If the total iron amount exceeds 0.18 wt %, the luminous transmittance tends to be low.

Iron is usually present in the form of $Fe^{3+}$ and $Fe^{2+}$ in glass. The one present in the form of $Fe^{3+}$ is an ultraviolet ray absorbing component having an absorption band in a near ultraviolet region. Further, if the proportion of FeO in the total iron content exceeds 10 wt %, it is likely to be reduced, the refining effect of iron, and an amber color tends to form. $SO_3$ is useful as another refining agent, and if its content is less than 0.05 wt %, the effects tend to be inadequate, and if it exceeds 1.0 wt %, an amber color is likely to form.

$MnO_2$ is useful as a red color developing source to obtain a brown color. If the content of $MnO_2$ is less than 0.36 wt %, such effects tend to be inadequate, and brown-colored glass tends to be hardly obtained. On the other hand, if it exceeds 0.65 wt %, the luminous transmittance tends to be low. Manganese is effective as the above-mentioned red color developing source in the form of $Mn^{3+}$. Accordingly, it is preferred to incorporate sodium nitrate at the time of melting for the oxidation of the glass material. Further, to the above-mentioned glass composition, CoO may be incorporated in an amount of from 0 to 0.0018 wt % as a colorant, whereby it is possible to adjust the color to a color tone close to the conventional brown-colored glass. If the content of CoO exceeds 0.0018 wt %, the luminous transmittance tends to be low. Within the above-mentioned ranges, preferred contents are as follows. Vanadium as calculated as $V_2O_5$ is from 0.10 to 0.18 wt %; $MnO_2$ is from 0.4 to 0.6 wt %; CoO is from 0 to 0.0015 wt %, and iron as calculated as $Fe_2O_3$ is from 0.08 to 0.16 wt %.

Preferred as window glass for buildings is the one whereby the dominant wavelength by illuminant C is from 574 to 581 nm, and the excitation purity is from 4 to 6%. On the other hand, preferred as window glass for vehicles is the one which has, in a thickness of from 3 to 5 mm, a luminous transmittance of illuminant A of at least 70% and an ultraviolet ray transmittance of at most 15%. The one which has, in a thickness of from 3 to 5 mm, a transmittance of 350 nm of at most 10%, is particularly preferred as window glass for each of buildings and vehicles.

In the present invention, $V_2O_5$ and $Fe_2O_3$ in the soda lime silica glass have absorption bands in the ultraviolet region, and thus they are believed to provide effects for reducing the ultraviolet ray transmittance of the glass. $V^{5+}$ has an ultraviolet absorption band at about 350 nm, and $Fe^{3+}$ has an absorption band from a near ultraviolet region to a visible light region of 360, 380 and 420 nm. Therefore, it is believed that by the presence of these metal ions, ultraviolet rays can effectively be absorbed.

EXAMPLES

A formulated batch was melted in a practical atmosphere ($O_2$ concentration: about 2%), and a glass was prepared therefrom by a small size test apparatus of float process. In Table 1, compositions for such glass are presented (unit: wt %). As the raw materials, silica sand, feldspar, dolomite, soda ash, Glauber's salt, sodium nitrate, manganese oxide, ferric oxide, vanadium pentoxide and cobalt oxide were used. Comparative Example 6 represents current brown-colored glass produced by the float method, which is commercially available for buildings and vehicles. Comparative Example 7 represents ultraviolet ray absorbent brown-colored glass. With respect to these glasses, transmittance for solar radiation, luminous transmittance, dominant wavelength and excitation purity were determined in accordance with JIS R-3106, and the results are shown in columns for TE, Tva, Dw and Pe in Table 1, respectively. The ultraviolet ray transmittance was calculated in accordance with ISO 9050 and presented in a column for Tuv in Table 1. T in Table 1 represents the transmittance for an ultraviolet ray with a wavelength of 350 nm (such a value is the one calculated as of a thickness of 5 mm).

Further, these glasses were irradiated for 30 days by the light from a mercury lamp (200 W; irradiation energy: 364 W/m$^2$), whereby the color difference before and after the irradiation was obtained, and the discoloration due to the ultraviolet rays was measured. The dose of the ultraviolet rays corresponded to the amount of usual solar radiation in Tokyo of about five years. With respect to the color difference, $\Delta E_{ab}$ was obtained in accordance with L*a*b* system of JIS Z-8730. As a result, the color differences of the plate glasses according to the present invention were not higher than 1.50. Whereas, the color difference of the glass of Comparative Example 7 was at least 5.00.

Thus, the plate glass of the present invention is a brown-colored glass which is excellent in the ultraviolet ray absorbing ability and which is not discolored by ultraviolet rays.

Glauber's salt is effective. Accordingly, the refining affect can be obtained by a conventional operation using a conventional glass melting furnace, such as with the float glass production process. Likewise, the concentration of a coloring agent in the base composition may be at the same level as in usual float glass, and a change of the base composition may be conducted in the same manner as in a conventional operation.

We claim:

1. Ultraviolet ray absorbent colored glass for buildings and vehicles, which consists essentially of from 65 to 75 wt % of $SiO_2$, from 0.1 to 5.0 wt % of $Al_2O_3$, from 10 to 18 wt % of $Na_2O$, from 0 to 5 wt % of $K_2O$, from 5 to 15 wt % of CaO, from 1 to 6 wt % of MgO, from 0.05 to 1.0 wt % of $SO_3$, from 0.08 to 0.20 wt % of vanadium as calculated as $V_2O_5$, from 0.36 to 0.65 wt % of $MnO_2$, from 0 to 0.0020 wt % of CoO and from 0.06 to 0.18 wt % of iron as calculated as $Fe_2O_3$, wherein from 0 to 10 wt % of the total iron content is FeO.

2. The ultraviolet ray absorbent colored glass according to claim 1, which has a brown color, whereby the Illuminant C dominant wavelength is from 574 to 581 nm, and the excitation purity is from 4 to 6%.

TABLE 1

| No. | Plate glasses | | | | | Comperative Examples | |
|---|---|---|---|---|---|---|---|
| | 1 | 2 | 3 | 4 | 5 | 6 | 7 |
| Composition | | | | | | | |
| $SiO_2$ | 72 | 72 | 72 | 72 | 72 | 72.2 | 72 |
| $Al_2O_3$ | 1.72 | 1.72 | 1.72 | 1.72 | 1.72 | 1.76 | 1.72 |
| CaO | 7.6 | 7.6 | 7.6 | 7.6 | 7.6 | 8.32 | 7.60 |
| MgO | 3.88 | 3.88 | 3.88 | 3.88 | 3.88 | 3.65 | 3.88 |
| $Na_2O$ | 12.8 | 12.8 | 12.8 | 12.8 | 12.8 | 13.16 | 12.8 |
| $K_2O$ | 0.68 | 0.68 | 0.68 | 0.68 | 0.68 | 0.52 | 0.68 |
| $Fe_2O_3$ | 0.08 | 0.08 | 0.12 | 0.14 | 0.16 | 0.38 | 0.33 |
| $V_2O_5$ | 0.1 | 0.15 | 0.14 | 0.13 | 0.1 | — | — |
| $MnO_2$ | 0.4 | 0.5 | 0.5 | 0.6 | 0.6 | — | 0.50 |
| $SO_3$ | 0.3 | 0.3 | 0.3 | 0.3 | 0.3 | 0.30 | 0.30 |
| CoO | — | — | 10 ppm | 15 ppm | 8 ppm | 5 ppm | 23 ppm |
| $TiO_2$ | 0.02 | 0.02 | 0.02 | 0.02 | 0.02 | 0.02 | 0.02 |
| Se | — | — | — | — | — | 6 ppm | — |
| $CeO_2$ | — | — | — | — | — | — | 0.80 |
| $FeO/Fe_2O_3$ (%) | 2.92 | 3.00 | 3.32 | 3.17 | 1.95 | 26.70 | 1.50 |
| TE (%) | 82.7 | 81.2 | 78.9 | 80.3 | 81.8 | 64.7 | 78.1 |
| Tva (%) | 81.2 | 79.0 | 73.7 | 76.6 | 79.0 | 74.8 | 73.9 |
| Tuv (%) | 10.39 | 5.97 | 5.20 | 5.11 | 8.61 | 33.42 | 13.17 |
| T (%) | 1.93 | 0.39 | 0.28 | 0.29 | 1.30 | 36.71 | 1.6 |
| Dw (nm) | 580 | 580 | 579 | 578 | 580 | 576.6 | 577 |
| Pe (%) | 4.15 | 5.71 | 5.94 | 5.93 | 5.83 | 5.39 | 5.54 |

As described in the foregoing, the glass of the present invention has a high luminous transmittance and is capable of absorbing ultraviolet rays, and thus it is effective for preventing deterioration of interior materials due to ultraviolet rays or for preventing sun burn of a person inside of the glass window. Accordingly, it is particularly useful as a window glass material for buildings and vehicles. Further, it is hardly discolored by ultraviolet rays, and even when it is used for an extended period of time, its color tone undergoes almost no change. Further, it can be prepared under an oxidation-reduction condition at the same level as usual plate glass, and the function of a refining agent such as 3. The ultraviolet ray absorbent colored glass having a brown color according to claim 2, which has, in a thickness of from 3 to 5 mm, a luminous transmittance of Illuminant A of at least 70% and an ultraviolet ray transmittance of at most 15%.

4. The ultraviolet ray absorbent colored glass having a brown color according to claim 3, which has, in a thickness of from 3 to 5 mm, a transmittance of 350 nm of at most 10%.

* * * * *